June 5, 1928.
J. W. GORDON
1,672,155
SIGHTING DEVICE
Filed July 27, 1926
3 Sheets-Sheet 1
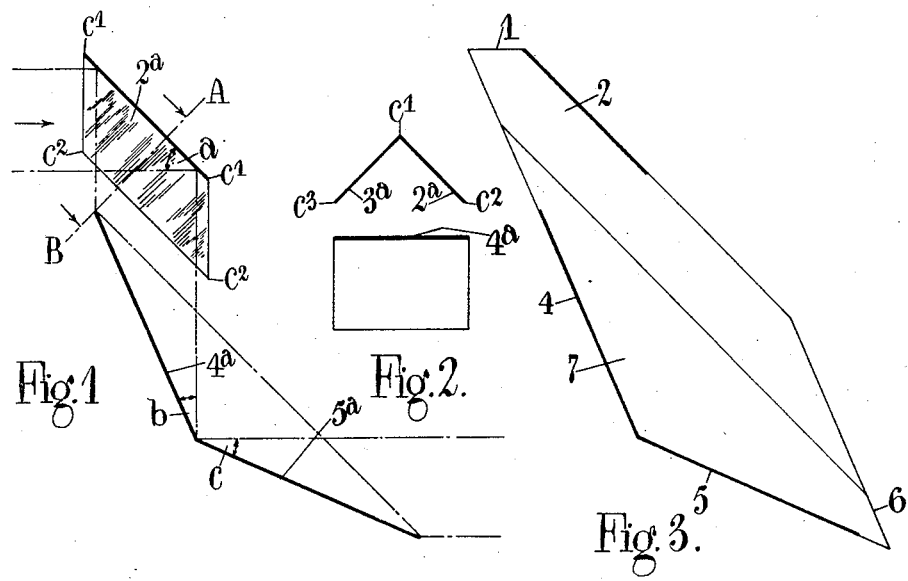
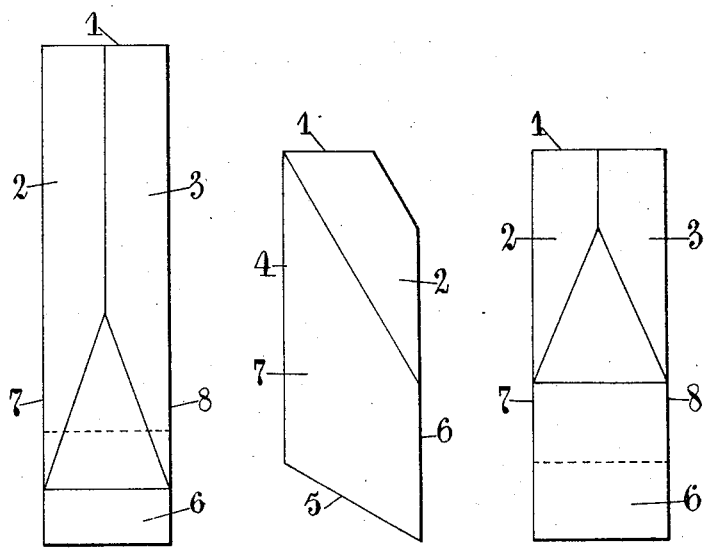
Inventor
J. W. Gordon
By Marks & Clerk
Attys.

June 5, 1928.

J. W. GORDON

SIGHTING DEVICE

Filed July 27, 1926

Inventor
J. W. Gordon
By Marks & Clerk
Attys.

June 5, 1928.
J. W. GORDON
1,672,155
SIGHTING DEVICE
Filed July 27, 1926  3 Sheets-Sheet 3
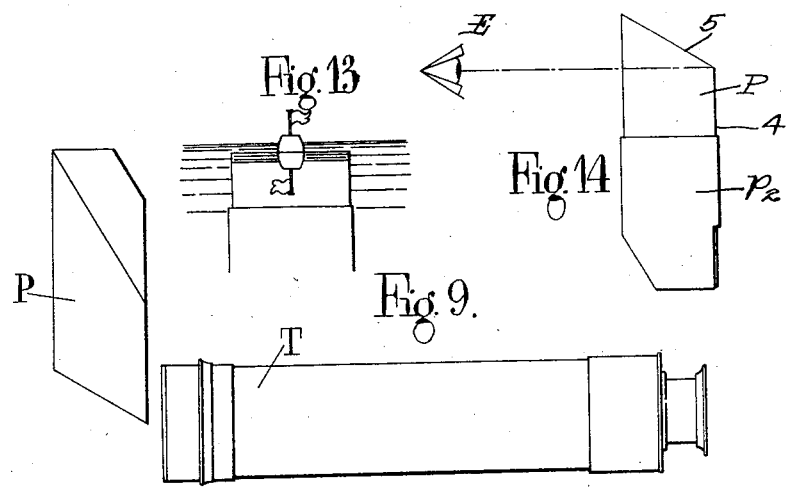
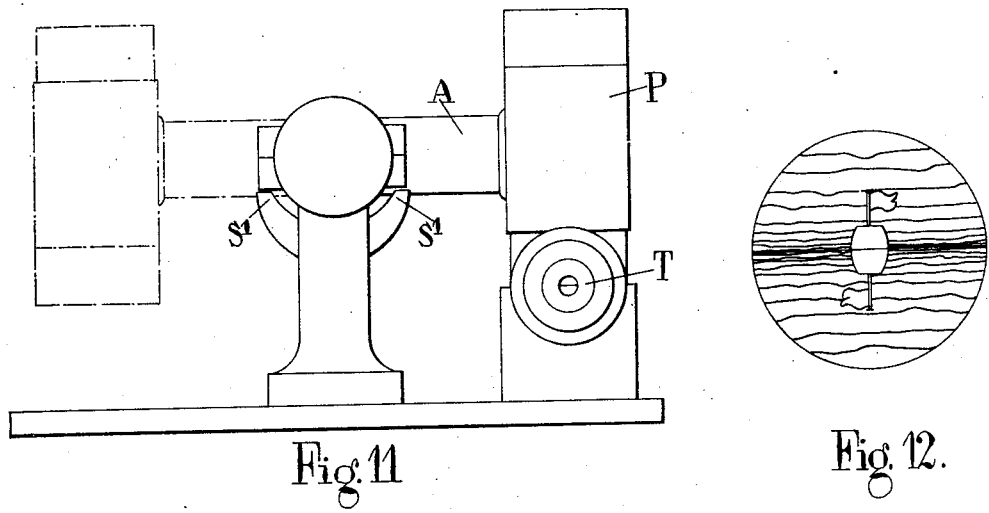
Inventor
J. W. Gordon
By Marks & Clerk
Attys.

Patented June 5, 1928.

1,672,155

UNITED STATES PATENT OFFICE.

JOHN WILLIAM GORDON, OF TEMPLE, LONDON, ENGLAND, ASSIGNOR TO ALEXANDER CONSTANTINE IONIDES, JUNIOR, OF LONDON, ENGLAND.

SIGHTING DEVICE.

Application filed July 27, 1926, Serial No. 125,252, and in Great Britain August 5, 1925.

This invention relates to appliances for sighting or aligning on to a distant object, such for example as a target, when aiming a rifle, gun or the like.

The object of the present invention is to provide an improved device of the type indicated.

The invention consists in a sighting device having means for securing the reprojection upon itself of the target or other object sighted upon.

The invention further consists in an appliance as indicated in which the reprojecting means comprise a prism or the like having a plurality of reflecting surfaces inclined to one another.

The invention also consists in improvements in or relating to sighting devices as hereinafter described.

Open sights for rifles, machine guns and the like, as commonly constructed, consist of a foresight and a backsight so arranged that the marksman looks through the backsight and over the foresight when taking aim, visually projecting the foresight upon his target. In this arrangement the foresight tends to obscure the foreground of the object sighted on and in the case of a small target may seriously obscure the target itself. When telescopic sights are used the foresight is dispensed with and webs, graticules or the like are introduced into the focal plane of the telescope which are optically projected upon the target. These fiducial marks then take the place of the foresight in an open sight and serve, by their visible coincidence with the target as seen by the marksman, to ascertain the correctness of his aim.

Now I have found that both the foresight of the open sight and the webs or other fiducial marks of the telescopic sight may with advantage be dispensed with if they are replaced by an image of the target projected visually, or by other means of optical projection, upon the target itself in the act of taking aim. This projection of the image of the target upon the target may be brought about in various ways and the present invention is not limited to any particular mode of securing that result.

The accompanying drawings illustrate the following description, and in these drawings:—

Figure 1 is a view of the reflecting surfaces of a prism showing the course of a beam of light;

Figure 2 is a section on the line A—B of Figure 1;

Figures 3 and 4 are views of a prism providing reflecting surfaces in accordance with Figures 1 and 2;

Figures 5 and 6 show another prism of different form;

Figure 9 is a diagram showing a similar prism to that shown in Figures 5 and 6 in combination with a telescope;

Figures 10 and 11 show a telescope and prism mounted in such a manner that the prism is displaceable;

Figures 12 and 13 illustrate respectively an object viewed through a telescopic and through an open sight as obtained in the apparatus shown in Figures 10 and 11;

Figure 14 is another view of the prism mounted for use as an open sight.

Figure 7:
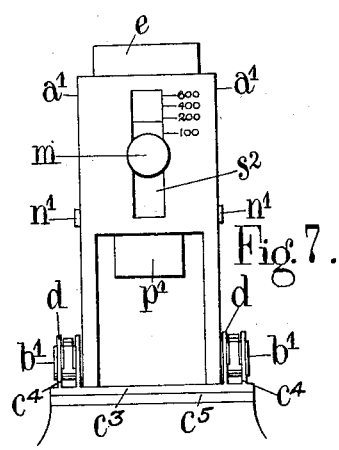
Figures 7 and 8 show respectively a back and side view of the prism shown in Figures 5 and 6 mounted as a rifle sight.

In its most advantageous form the sight is so designed that it reprojects upon the target an image of itself doubly reversed, that is to say, reversed right for left and top for bottom. Such a sight, according to my invention, consists essentially of four mirror surfaces arranged in pairs so that one pair shall effect reversal in one sense—say right for left—and the other pair in the other sense—say top for bottom. The two pairs of mirrors are then so disposed with reference to one another that the inverted beam is brought back after its last reflection into parallelism with the incident beam, or it may if desired, as for instance with the object of taking the observer's body out of the line of sight, be further turned through a right angle. Taking the first-mentioned case in which the emergent beam is brought back into parallelism with the incident beam I may illustrate the course of the beam by Figure 1.

In this figure the mirror surfaces are partly in outline and partly in section, the outlines being traced in thin lines and the sections in thick lines. The course of the transmitted beam is indicated in broken lines. A cross section of the mirrors of Figure 1 upon the line A..B is shown in Figure 2. The mirror faces are numbered $2^a$, $3^a$, $4^a$ and $5^a$. The incident beam of light may be supposed for the purpose of description to be divided into four subdivisions which will hereinafter be referred to as the upper right, upper left, lower right and lower left segments. It is to be understood that the upper and lower left segments are incident upon the mirror face numbered $2^a$ and the upper and lower right segments are incident upon the mirror face numbered $3^a$, the upper segments of the beam being incident on the upper halves of the said mirrors respectively and the lower segments on the lower halves. Adopting this nomenclature we will trace out the course of the transmitted beam. To take first the upper left segment. This is incident on the upper half of the mirror $2^a$ and is from it reflected on to the mirror $3^a$. From the mirror $3^a$ it is reflected on to the upper right half of mirror $4^a$ and from mirror $4^a$ to the lower right half of mirror $5^a$. If the angles of the mirrors are correctly adjusted the beam will follow, after this last reflection, a course parallel to that of the incident beam. Similarly the upper right segment will be eventually reflected from the lower left half of mirror $5^a$, the lower left segment from the upper right half of mirror $5^a$ and the lower right segment from the upper left half of the said mirror. Furthermore the constituent rays composing these several segments will be subject to corresponding displacements so that the ray which enters farthest to the left of either of the left-hand segments will be eventually reflected from the extreme right-hand edge of the mirror $5^a$ and so with other rays; every ray will throughout all the reflections which it undergoes retain its distance from the central ray of the beam but will change over from a point on one side of that ray in the incident beam to a point equidistant from the said central ray but on the other side thereof in the emergent beam. Hence the beam will be by these four reflections completely reversed and if after emergence it is focussed so as to yield a picture the picture will be similar in all respects to that yielded by the incident beam under similar conditions of focussing except that it will be doubly reversed by comparison therewith; that is to say reversed both right for left and top for bottom.

The due adjustment of angular relations between the mirrors depends upon the following principles:

In the first place the mirrors $2^a$ and $3^a$ must be plane mirrors placed at right angles to one another as shown in Figure 2. The crest $c_1..c_1$ of this pair of mirrors, which must be the edge of an accurately shaped right-angled joint, is to be disposed at some determined angle $a$ to the axis of the incident beam. The choice of this angle is at the option of the designer who will be guided by considerations which it is not necessary to discuss in this specification. When made his choice of this angle will determine the dimensions and positions to be given to the remaining mirrors $4^a$ and $5^a$. After reflection from the reversing right-angled mirror $C_1 C_1 C_2 C_2$ (i. e. $2^a, 3^a$) the beam will be deflected from its original course through an angle equal to $2^a$. It is the function of the two mirrors $4^a$ and $5^a$ to restore the deflected beam to its original direction and to give to it a second reversal supplementary to that endured by it on reflection from the right-angled mirror ($C_1 C_1 C_2 C_2$) $2^a..3^a$. For this purpose the mirror 4 must have an area equal at least to that of a section of the reflected beam in the position which the said mirror is designed to occupy. The designer is at liberty to exercise within limits a choice of the position in the beam to be assigned to the mirror $4^a$. Let it be such that the axis of that reflected beam meets the surface of this mirror at an angle $b$. The mirror $5^a$ must be placed in the beam reflected from mirror $4^a$ and be of such size and shape that it will in its turn reflect that reflected beam. It is moreover to be placed with its surface at an angle $c$ to the axis of the so reflected beam, the angle $c$ being such that $(b+c)=a$. Then after reflection from mirror $5^a$ the emergent beam will be directed in a course parallel to that of the incident beam. Hence the angle between the surfaces of the two mirrors $4^a$ and $5^a$ must be $\pi-(b+c)$ and the pair of mirrors may be either symmetrical or unsymmetrical according to design, but the two are to be plane mirrors and disposed with their crest, or meeting line, at right angles to the crest of the right-angled mirror $C_1 C_1 C_2 C_2$ $(2^a..3^a)$.

These mirrors may be formed of polished metal or glass surfaces as may be desired. If of glass they may be four sides of a glass prism so disposed as to be totally reflecting. For instance if the four mirrors of Figures 1 and 2 were required to be embodied in a glass prism it would take the shape shown in Figures 3 and 4.

I will now describe in fuller detail and by way of illustration a glass prism constructed for use either as a complete open sight, or with the addition of a telescope, as a telescopic gun sight for use with ordnance as shown in Figure 5.

The prism is eight-sided, of rectangular cross section and of suitable breadth and thickness.

The faces may be numbered 1 to 8, and number 6 may be referred to as the back of the prism.

The bottom face of the prism hereinafter referred to as 5 is sloped upwards away from the back at an angle thereto of 60° and a top portion of the prism is sloped forwards and upward away from the back in two faces, in future referred to as 2 and 3, which are at right-angles to one another and which meet on a crest or line inclined to the back side 6 at an angle of 150°, the two faces terminating on the two back corners of the upper face which is hereinafter referred to as 1 and which in view of the slope of the faces 2 and 3 has the form of an isosceles triangle with an apex angle of about 81° or 82°.

The front face of the prism numbered 4 is rectangular and parallel to the back face 6, while the two larger faces numbered 7 and 8 are those formed by the right and left sides of the rectangular cross section of the original material and are quadrilateral with two only of their edges parallel with one another. The back face 6 has the form of a rectangle surmounted by an isosceles triangle having an apex angle of rather more than 53° and the bottom face 5 takes the form of a plane rectangle.

The faces 2 and 3 are disposed at right-angles to one another and the crest line on which they meet makes an angle of 30° with the face 4. Therefore rays entering the prism in a direction perpendicular to the face 4 and passing through the upper part thereof will be reflected by the hinder faces 2 and 3, acting in combination as a reversing mirror on to the lower part of the said face 4 and will strike that face at an angle equal to 60° to the normal thereto having been deflected through an angle equal to 120° out of their original course. From face 4 they are reflected to face 5 and forasmuch as 5 is disposed at an angle equal to $\left(\frac{3}{4}\pi - \frac{a}{2}\right)$ to 4 the reflected rays will be incident upon it at an angle equal to 60° to the normal to its surface. Hence they will be reflected from this last-named surface in a direction parallel to their original direction before incidence on the prism face 4. The face 6 being made parallel to the face 4 the reflected beam will pass out of the prism in a direction parallel to its original direction but having undergone two reversals in the course of transmission. The first reversal arises by reason of the reflection from 2 to 3, the second by reason of the reflection from 4 to 5.

Consequently when the prism is placed so as to give the marksman a view of his target the object, as so seen, will appear doubly reversed, that is to say, right for left and top for bottom.

A glass prism made in this form is totally reflecting and will operate as above described without being silvered, but it is very desirable in the case of a gun sight to reduce to a minimum the extent of exposed surface upon which dust and moisture can collect. With that object when it is considered desirable, the working parts, excepting the two windows, may be coated with silver. The silvered surfaces may then be protected with varnish or otherwise in the usual way of protecting glass mirrors.

A prism in this form may be mounted on a rifle in the position usually occupied by the backsight, but whereas in the ordinary construction of an open sight the marksman looks over the edge of a V-shaped opening, it has, in accordance with the present invention, been found advantageous to dispose the prism so that the marksman shall look underneath the face 6 at the target itself choosing for eye-point a position from which he can see within his field of vision both the uncovered target occupying the lower part of that field, and the reversed image occupying the upper part of the field, the two images coinciding in the point aimed at. In this way there is secured in both halves of the picture a clear view of the foreground of the picture as well as of the point exactly aimed at—an arrangement which greatly facilitates the aim.

Figure 8:
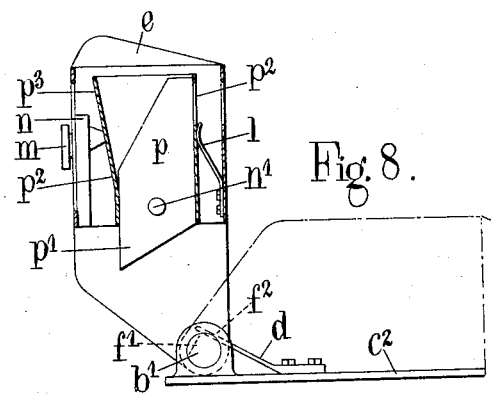

For use in a rifle sight the prism shown in Figures 5 and 6 may be mounted as shown in Figures 7 and 8. Figure 7 shows the complete sight in back view and Figure 8 shows the same sight in two positions. In the closed position, shown in broken lines, the external view of the complete sight is shown, but in the open position, shown in full lines, the near side plate of the external casing has been removed showing in section an internal casing in position in the interior of the external casing. $a'$ $a'$ are side walls of the outer casing which are extended downwards to form supporting legs which are pivoted by means of pins $b'$ $b'$ to the base plate $c^3$, the base plate being provided with lugs $c^4$ $c^4$ for the purpose of receiving the pivots $b'$ $b'$. These pivots are flattened on two faces $f'$ and $f^2$ so that the sight may, by the pressure of the springs $d$ $d$, be held fast in the open or closed position when placed in either of these positions. An elevation or projection $e$ formed on the top of the outer case facilitates the opening or closing of the sight against the pressure of these springs.

The prism itself $p$ is shown within its inner case $p^2$, the part $p'$ being shown projecting. This inner case $p^2$ is made to fit the prism closely except at the upper part of the rearward face. The prism is held securely within this inner casing, as for instance by cementing it in position. The rearward face $p^3$ of the casing is inclined outward as shown or is provided with a ramp or inclined surface which bears upon the point of a positioning slide $n$. This slide enables the user to place the prism in position for aiming at a particular range. For this purpose if the range is extended the prism must be tilted forward so as to incline towards the muzzle of the gun. Inasmuch as in sighting an object the line of sight is invariably normal to the window surfaces of the prism such tilting forward of the prism leads automatically to a corresponding elevation of the gun barrel. If the angle of this tilt be correct the resulting elevation of the gun will correspond to the range of the object aimed at.

The action of the slide in adjusting the prism for range will now be evident from the drawing, Figure 8. The inner casing $p^2$ is pivoted by pins $n'$ fitted where shown upon inner casing. These pins pass through perforations in the outer casing and hold the inner casing suspended in the interior of the outer casing. A spring $l$ fixed to the interior of the outer casing presses the inner casing back with elastic force upon the slide $n$ and between the spring and the slide the inner casing, and with it its contained prism, is held in a determinate position within the outer casing. The angle so determined depends evidently upon the position of the slide $n$ which, when it is raised, presses the prism forward and makes it incline towards the muzzle of the rifle and when it is drawn down allows the spring $l$ to press the prism back into erect position. For manipulating the slide to adjust the prism for range the slide is provided with a thumb piece $m$ which projects through a slot $s^2$ and expands into a flattened top $m$ outside the outer casing. The slot $s^2$ is occupied in part by a rib formed on the back face of the slide $n$ while the inner part of the slide extends laterally beyond the slot and slides on the inner face of the outer casing. It is kept in contact with this outer case and its rib is forced into the slot $s$ by the pressure of the spring $l$ transmitted through the inner casing. The friction of the point of the slide upon the back face of the casing may be made sufficient to keep the slide in position when it is adjusted for a given range and, if necessary, the said back face may be roughened or provided with indentations or with a corrugated surface to render this hold more secure. The top edge of this rib or key is visible, as shown in Figure 7, within the slot and may be utilized as a fiducial mark for determining the the range. In that case the range may be indicated by a scale inscribed in the outer casing at the side of the slot as shown.

To provide for adjusting the slide for drift the base plate $c^3$ may be mounted upon an under base plate $c^5$ which is itself made fast to the upper surface of the gun stock or chamber as is usual with back sights. The base plate $c^3$ is placed on this foundation and held fast there by two screws. The one screw passes through a screw hole into which it fits closely; the other passes through a slot arranged athwart the base plate $c^3$. In order to adjust for drift both screws are slackened sufficiently to allow the axis of collimation of the prism to be directed at the required angle to the axis of the gun and the screws are then tightened in position.

A prism constructed according to Figures 5 and 6 may be used in combination with a telescope as shown in Figure 9. This figure shows diagrammatically the position of the prism P in relation to the telescope T. The actual supports in which the prism and telescope are held are not shown since they can be designed in a large number of well-known ways of mounting prisms and telescopes all effective for the purpose and the mode of mounting constitutes no indispensable part of the present invention. The telescope, when in use, is brought into position as shown in the diagram behind the prism so that one half of its object glass shall be covered by the prism and the other half uncovered. Through the uncovered half the telescope affords a direct view of the target which is seen inverted if the telescope is of the astronomical type but erect if of the Galilean type. The covered half of the object glass transmits to the marksman's eye a view of the target as seen through the prism and this will, of course, be doubly reversed as compared with the direct telescopic view. Across the telescopic field there is a narrow zone in which the two images overlap and in the centre of this zone is the point aimed at to which the axis of collimation of both prism and telescope is directed. The supports of both prism and telescope are so designed that the two axes of collimation shall coincide when the telescope is in use. It will sometimes be found advantageous to support the telescope removably in operative position. This arrangement is particularly convenient when the telescope is of high power for in that case its field is small and it is advantageous to be able to remove it and use the prism by itself as an open sight in order to facilitate the finding of the target and the taking of an approximate aim which can be accurately adjusted when the telescope is replaced in position for use.

Figure 10:
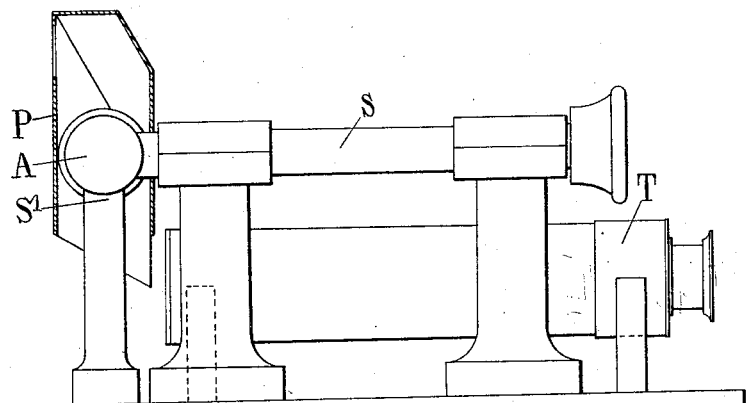

An alternative to displacing the telescope for the purpose of making the prism available as an open sight is to make the prism displaceable, the telescope remaining fixed in place. A method of mounting the prism for this purpose is shown in Figures 10 and 11. Here P is the prism holder and T is the telescope shown in end view in Figure 11. The prism holder, containing the prism, is securely mounted on an arm A which is itself carried by a shaft S. The shaft is supported in journals so that it can be rocked for the purpose of placing the prism in position in front of the telescope as shown in Figure 10 or for that of placing it clear of the telescope as shown in dotted lines in Figure 11. When in the dotted line position the prism may be used as an open sight the marksman looking across the edge of the prism which in this inverted position is its upper edge. To facilitate the changing over from the open sight to the telescopic sight position, and vice versa, the rocking of the shaft S is controlled by two stops S' S' which allow it to be rotated about an angle of 180° but bring it to rest in the upright position shown in Figure 10 and in full lines in Figure 11 and again in the inverted position shown in dotted lines in Figure 11.

When using the prism as an open sight the marksman levels his eye so that the axis of collimation of the prism may pass through the centre of the pupil of his eye. He will then see the object direct by means of the beam of light admitted by the uncovered half of the pupil of his eye and he will see it as inverted by the prism by means of the beam admitted through the lower half of his pupil. So far the conditions of vision are similar to those obtaining in the telescopic sight except as to scale of the image and extent of the field, but there is another distinction, for in the telescopic sight the prism cuts out the background of the picture whereas when the prism is inverted for the purpose of yielding an open sight it cuts out the foreground of the picture. The cutting out is not complete in either case. Traces of the background appear in the one case and traces of the foreground in the other and in the central region parallel with the edge of the prism there is a zone in which both the background and foreground are strongly represented. The appearances are shown in Figures 12 and 13. The object represented is a buoy at sea. In Figure 12 it appears as seen in the telescope, the background being occupied by the inverted foreground of the image seen through the prism against which the flag is seen, the double picture being framed in the aperture of the telescope. In Figure 13 the same object appears as seen by the naked eye, the inverted image appearing as an inset picture framed by the aperture of the prism. It is obvious that the object is more easily found and the sight directed towards it in the case of the open sight than in the case of the telescopic sight whereas the aim can be more accurately adjusted by the latter. The arrangements illustrated in Figures 10 and 11 make it possible to pass instantaneously from the open to the telescopic sight so that advantage may be taken by the marksman of both forms of the appliance in the adjustment of his aim.

If the marksman desires to see in the inverted open sight the same combination of pictures as in the field of the telescope, that is to say if he wishes to cut off the background—not the foreground—of the two pictures, he may direct his gaze under and not over the last reflecting surface 5 of the prism P looking through the prism at the erect as well as at the inverted image. In order that he may be able to do this a sufficient window space 4 must be left below the last reflecting face 5 as shown in Figure 14, where the prism P is shown projecting from its housing $P_2$ for a sufficient distance to give the marksman whose eye is shown at E an erect view of his target through the prism below the inverted view of it reflected from the inner face 5 of the prism.

When designing a gun sight in this form it is to be borne in mind that when the aim deviates from the mark the visible angle of deviation is doubled by reason of the displacement of the one image by an equal angle in an opposite sense as compared with the other image. Hence to secure equal acuity of aim a gun sight of this type, requires only half the magnifying power of an ordinary telescopic sight. Thus the open sight arrangement described is equivalent in this respect to a telescopic sight of magnifying power $X^2$ and when fitted with a telescope doubles the efficiency of the glass for the purpose of sighting. This is of great importance in connection with sights for use in feeble light for the apparent brilliancy of the image is proportional directly to the area of the aperture and inversely to the square of the magnifying power. Hence if equivalent sights are compared, the sight in accordance with the present invention gives doubled brilliancy at the point of aim where its two images coincide and an average of equal brilliancy in other parts of the field where the coincidence of light with shadow, light with light, and shadow with shadow in various parts of the picture is matter of chance. Hence it is advantageous in fading light to reduce magnifying power beyond the point at which the exit pupil of the glass is equal in area to the pupil of the marksman's eye, this last-named condition being, as is well known, the condition which limits the extent to which magnifying power can be usefully reduced for the purpose of increasing the visibility of the target in an ordinary telescopic sight. Alternatively, if it is desired to produce a sight according to the present invention of equal aiming acuity and of equal brilliancy at the point of aim by comparison with an ordinary telescopic sight, an object glass of smaller aperture may be used and an instrument of correspondingly reduced dimensions may be produced.

It is a matter of importance that the reflecting surfaces of the prism should be completely protected from the deposit of moisture and dust both of which, if allowed to accumulate, would impair its action. The prism when made of optical glass is totally reflecting and therefore so long as it is perfectly clean it cannot be improved by silvering it, but I consider that it is a wise precaution to coat the reflecting surfaces with protective varnish in order to preserve them from moisture and dust and when this is done it is necessary to deposit a silver coating beneath the varnish. A prism so coated presents only the fore and aft windows as exposed glass surfaces that can at any time want cleaning and these may be so arranged with reference to the casing in which the prism is housed as to be easily accessible for the purpose.

In the construction of gun sights it is of importance that moisture should be excluded from the interior of the telescope and it is for this reason desirable that the bezelling of lenses should be made airtight. I have discovered that this may be done by cementing the lenses in their cells by means of a readily fusible solder. If a readily fusible solder melting at about 100° C. or less be pressed into contact with a clean and polished glass surface at that temperature it will make optical contact therewith and if it is allowed to cool gently it will maintain its contact during the process and will be found when cool to have made a good joint with the glass. Glass surfaces can be cemented together in this way or glass may thus be cemented to metal. The making of the optical contact is fascilitated if the glass is subjected to a preliminary silvering for the solder will attach itself securely to the silver. Bezel joints so constructed are strong, put no strain upon the lenses, and can be made airtight. This mode of securing prisms in position can be used for mounting the euthynter prism in its casing. It will, however, be understood that this method of cementing glass to glass or glass to metal depends upon the maintainance of optical contact and has not, therefore, the complete solidity of a soldered metal joint in which the solder forms an alloy with the surface to which it adheres. It is desirable, therefore, to add external support to such joints and in particular to protect them, so far as possible, against sudden shock. The bezel mount affords such protection in the case of lenses and when it is a question of fixing prisms in their seating it is desirable to design the seating in such a way that bezel support is afforded in addition to the adhesion due to the optical contact.

Instead of a glass prism a combination of mirror surfaces may be used having the same relative positions as those occupied by the internal faces of the prism above described and it will be obvious that other dispositions of reflecting surfaces than those hereinbefore described might be employed to bring about the same or an equivalent optical result.

Having now described my invention what I claim as new and desire to secure by Letters Patent is:—

1. A gun sight comprising a plurality of reflecting surfaces comprising two coacting pairs of which one pair is arranged to receive light rays direct from the object aimed at and the other pair to coact with the first to produce an image of said object reversed relatively to and apparently projected upon an image of the object itself seen directly, coincidence of a corresponding point in the two images serving to identify the direction in which the gun is aimed.

2. A reflecting system for gun sights comprising the combination of four reflecting surfaces disposed in two reversing pairs and co-operating with one another to receive rays from and produce an inverted image of the object being sighted and to project the rays forming said image in parallelism with the rays incident to the system, said system being so placed in the gun sight as to cover one half of the marksman's field of view leaving the other half of his field of view uncovered.

3. A reflecting system for sighting purposes having a pair of intersecting reflecting surfaces arranged at right angles and disposed to receive light rays from the object being sighted and to reflect them reversed in one sense, and a second pair of intersecting surfaces forming an obtuse angle and having their line of intersection at right angles to but not meeting the line of intersection of the right angle pair, one of said obtuse angle pair approaching and capable of receiving the reversed rays from the right angle pair and reflecting them on to the other surface of the obtuse angle pair, said last-mentioned surface reversing the rays in a different sense to the reversal due to the right angle pair and being so inclined as to reflect said rays in a direction substantially parallel to that of the incident rays from the object.

4. A prism for sighting purposes having in combination one adjacent pair of facets forming a right angle and disposed to receive light rays from the object being sighted and to reflect them inwardly and reversed in one sense, a second pair of adjacent facets forming an obtuse angle with their common edge at right angles to but not meeting the common edge of the first pair, one of said obtuse angle pair approaching near and receiving the reversed rays of light reflected from said right angle pair and itself reflecting these rays on to the other facet of the obtuse angle pair and a fifth facet remote from and parallel to that facet of the obtuse angle pair which approaches near to the right angle pair, the said other facet of the obtuse angle pair reversing the received rays at right angles to the sense of the reversal due to the right angle pair and being so inclined to the remaining facets as to reflect said rays through and normal to said fifth facet.

5. A reflecting system for sighting purposes having a pair of intersecting reflecting surfaces arranged at right angles and disposed to receive light rays from the object being sighted and to reflect them reversed in one sense, and a second pair of intersecting surfaces forming an obtuse angle and having their line of intersection at right angles to but not meeting the line of intersection of the right angle pair, one of said obtuse angle pair approaching and capable of receiving the reversed rays from the right angle pair and reflecting them on to the other surface of the obtuse angle pair, said last-mentioned surface reversing the rays in a different sense to the reversal due to the right angle pair and being so inclined as to reflect said rays in a direction substantially parallel to that of the incident rays from the object and means for mounting said system as a gun sight and positioning it with respect to the eye of the observer so as to produce a reversed and inverted image of the object being sighted in a field adjacent to that containing the image of the object seen without reflection, the direction of said object being defined by the coincidence of at least one corresponding feature of the two images.

6. A gun sight comprising the system claimed in claim 3 in combination with a telescope mutually arranged so that at least a portion of the obect glass of the telescope is covered by at least one of either pair of the reflecting surfaces.

7. A gun sight comprising the system claimed in claim 3 in combination with a telescope mutually arranged so that one half of the object glass receives rays from the object unreflected, the remaining half of the object glass receiving rays passed through and reversed by the system.

8. A prism for sighting purposes having in combination one adjacent pair of facets forming a right angle and disposed to receive light rays from the object being sighted and to reflect them inwardly and reversed in one sense, a second pair of adjacent facets forming an obtuse angle with their common edge at right angles to but not meeting the common edge of the first pair, one of said obtuse angle pair approaching near and receiving the reversed rays of light reflected from said right angle pair and itself reflecting these rays on to the other facet of the obtuse angle pair and a fifth facet remote from and parallel to that facet of the obtuse angle pair which approaches near to the right angle pair, the said other facet of the obtuse angle pair reversing the received rays at right angles to the sense of the reversal due to the right angle pair and being so inclined to the remaining facets as to reflect said rays through and normal to said fifth facet and means for mounting said prism as a gunsight in combination with a telescope so that the upper half of the object glass receives rays from the object passing through and reversed by the prism, the lower half receiving rays direct from the object and passing immediately below the last reflecting surface.

9. A prism for sighting purposes as claimed in claim 4 in which the paired facets are arranged at such inclination that the rays from the object fall thereon and are reflected therefrom at angles not less than the critical angle for the material of which the prism is made thereby rendering the application of reflecting coatings to said facets unnecessary.

10. A gun sight comprising the system claimed in claim 3 in combination with a telescope mutually arranged so that at least a portion of the object glass of the telescope is covered by at least one of either pair of the reflecting surfaces and means for relatively displacing the telescope and the reflecting system for the purpose of using the said system as an open sight to obtain an approximate setting of the gun or the like.

11. A prism for sighting purposes having in combination one adjacent pair of facets forming a right angle and disposed to receive light rays from the object being sighted and to reflect them inwardly and reversed in one sense, a second pair of adjacent facets forming an obtuse angle with their common edge at right angles to but not meeting the common edge of the first pair, one of said obtuse angle pair approaching near and receiving the reversed rays of light reflected from said right angle pair and itself reflecting these rays on to the other facet of the obtuse angle pair, and a fifth facet remote from and parallel to that facet of the obtuse angle pair which approaches near to the right angle pair, the said other facet of the obtuse angle pair reversing the received rays at right angles to the sense of the reversal due to the right angle pair and being so inclined to the remaining facets as to reflect said rays through and normal to said fifth facet, means for mounting said prism as a gunsight in combination with a telescope so that the upper half of the object glass receives rays from the object passing through and reversed by the prism, the lower half receiving rays direct from the object and passing immediately below the last reflecting surface and means for displacing the prism from the telescope for the purpose of using said prism as an open sight to obtain an approximate setting of the gun or the like.

12. The combination for use as a gun sight or otherwise, in connection with a telescope, of a prism in accordance with claim 4 mounted upon an arm projecting from a shaft rotatably mounted with its axis parallel to the axis of said telescope for the purpose of removing the prism from the front of the telescope and enabling said prism to be used as an open sight for finding the object and approximately adjusting the position of the telescope.

13. An improved rifle sight comprising a reflecting system as claimed in claim 3 in combination with means for adjusting the inclination of said system to accommodate the sighting to the range.

14. An improved telescopic or gun sight comprising a prism according to claim 4 and a telescope, said prism carried upon an arm projecting from a shaft rotatably mounted with its axis parallel to the axis of said telescope, so that said prism system may be employed for sighting with or without the telescope.

In testimony whereof I have signed my name to this specification.

JOHN WILLIAM GORDON.